(12) United States Patent
Hoyer et al.

(10) Patent No.: US 10,692,341 B2
(45) Date of Patent: Jun. 23, 2020

(54) MOVABLE CAMERA SUPPORT, ASSEMBLY COMPRISING SEVERAL SUCH SUPPORTS, AND METHOD FOR OPERATING THE SAME

(71) Applicant: Axis AB, Lund (SE)

(72) Inventors: Olaf Hoyer, Lund (SE); Malte Bokvist, Lund (SE); Stefan Collryd, Lund (SE); Andreas Hertzman, Lund (SE); Mattias Uttke, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 16/379,013

(22) Filed: Apr. 9, 2019

(65) Prior Publication Data
US 2019/0310536 A1 Oct. 10, 2019

(30) Foreign Application Priority Data

Apr. 10, 2018 (EP) .................................... 18166558

(51) Int. Cl.
*G08B 13/196* (2006.01)
*H04N 5/225* (2006.01)
*H04N 7/18* (2006.01)

(52) U.S. Cl.
CPC ... *G08B 13/19623* (2013.01); *G08B 13/1963* (2013.01); *G08B 13/19619* (2013.01); *H04N 5/2252* (2013.01); *H04N 5/2257* (2013.01); *H04N 7/181* (2013.01); *G08B 13/19641* (2013.01)

(58) Field of Classification Search
CPC .............................................. G08B 13/19623
See application file for complete search history.

(56) References Cited

U.S. PATENT DOCUMENTS

| 4,777,527 | A | 10/1988 | Camps et al. |
| 5,241,380 | A | 8/1993 | Benson et al. |
| 9,535,311 | B2 * | 1/2017 | Bergsten ............... F16M 13/022 |

(Continued)

FOREIGN PATENT DOCUMENTS

| EP | 2887328 A1 | 6/2015 |
| WO | 2004/095386 A1 | 11/2004 |

OTHER PUBLICATIONS

Extended European Search Report dated Oct. 4, 2018 for the European Patent Application No. 18166558.9.

(Continued)

*Primary Examiner* — Clayton E. LaBalle
*Assistant Examiner* — Leon W Rhodes, Jr.
(74) *Attorney, Agent, or Firm* — Volpe and Koenig, P.C.

(57) ABSTRACT

A camera assembly with a camera dome, a camera housing, has a plurality of camera heads arranged inside the housing and the dome. Each camera head is arranged in a camera support which is movable around a center of the camera assembly and each camera support has a first, inner, follower portion configured to engage a first, inner, guide portion of the camera housing. Furthermore, each camera support has a second, outer, follower portion configured to engage a second, outer, guide portion of the camera housing. The camera support also comprises a camera head fixture connecting the first follower portion with the second follower portion. Each follower portion is arranged to slide in the corresponding guide portion.

17 Claims, 4 Drawing Sheets

(56) References Cited

U.S. PATENT DOCUMENTS

| | | |
|---|---|---|
| 9,690,172 B2 | 6/2017 | Donaldson |
| 2012/0154521 A1 | 6/2012 | Townsend et al. |
| 2018/0067382 A1 | 3/2018 | Bergsten et al. |
| 2019/0191059 A1* | 6/2019 | Park ................... H04N 5/2251 |

OTHER PUBLICATIONS

Wisenet, "Network Camera—User Manual," PNM-9080VQ/PNM-9081VQ (2017).
Wisenet, "Performance, Innovation, Reliability," WiseNet P—Panoramic and Multi-sensor/Multi-directional Cameras, Hanwha Techwin America (2017).

* cited by examiner

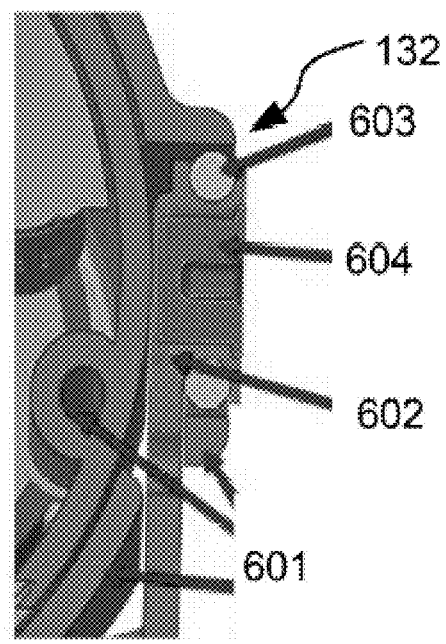
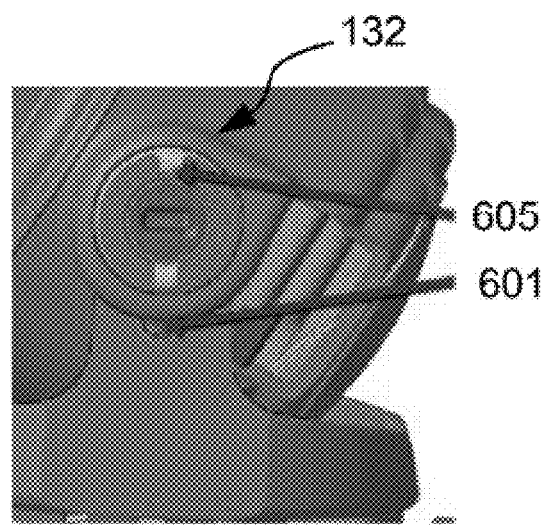
Fig. 6        Fig. 7
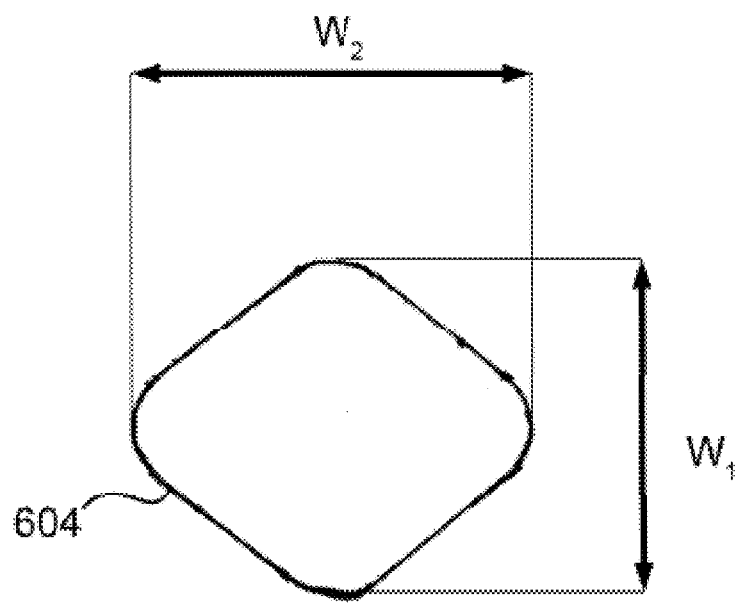
Fig. 8

MOVABLE CAMERA SUPPORT, ASSEMBLY COMPRISING SEVERAL SUCH SUPPORTS, AND METHOD FOR OPERATING THE SAME

BACKGROUND

The present teachings relate to a movable camera support, arranged to locate a camera in a movable fashion within a housing of a surveillance camera system. The present teachings also relate to an assembly comprising several such supports in a housing, and a method for operating the same.

A typical IP-camera includes a camera or camera head arranged in a housing having a transparent portion so as to enable acquisition of images with the camera head. In some situations, it may be beneficial to include several camera heads within a single housing, in order to provide a more versatile imaging of an area surrounding the housing. For optimal use of such multi-camera systems the individual camera heads are preferably movably arranged within the housing.

Prior-art examples of support arrangements include solutions where each camera head is arranged on a guide plate by means of screws, brackets, magnets, and the like as is disclosed in EP2887328 by the present applicant, as well as in products commercialized by the present applicant.

Although the present teachings do not relate to the camera head as such, but to a structural support for the same; within the context of the present application "camera head" primarily refers to an imaging device comprising a lens assembly and an image sensor. The camera head may also include image processing hardware and software, in which case it may have the full capability of a camera, yet for a system including several camera heads it may be preferred that image processing is performed in a control unit to which the camera head has a wired or wireless connection. For the same reason, although digital cameras or IP-cameras are specifically mentioned, the present teachings are equally applicable to analogue surveillance cameras.

There are a number of possible improvements to existing support arrangements, and several improvements may be connected to reliability and user experience. As an example: while the camera head supports should be movably arranged it must be possible to secure their positional setup once the desired setup is accomplished. Using screw means or clamping means to secure the support may be considered cumbersome and may also limit the motion to a number of discrete positions.

To this end there are a number of improvements that could be realized and the present teachings aim at providing some of them.

SUMMARY

According to a first aspect, the present teachings are embodied in a camera assembly having a camera dome, a camera housing, and a plurality of camera heads arranged inside the housing and the dome, each camera head being arranged in a camera support which is movable around a center of the camera assembly. Each camera support has a first, inner, follower portion configured to engage a first, inner, guide portion of the camera housing, and a second, outer, follower portion configured to engage a second, outer, guide portion of the camera housing, and a camera head fixture connecting the first follower portion with the second follower portion. Each follower portion is arranged to slide in the corresponding guide portion.

With the arrangement each camera support will be enabled to slide along the guide portions in the camera housing. In that way the camera head may be arranged in continuous positions while being securely positioned by the guide portions. The word "center" should not be exclusively construed as "geometrical center" even if that is what will be illustrated in the detailed description of embodiments. Embodiments could also include camera assemblies having a non-symmetrical shape, where "center" rather would be a position within the constraints of the camera assembly around which the camera support may be moved. Also "move around" does not exclude embodiments where camera supports are prevented from moving a full 360 degrees around the center.

In one or several embodiments the first and second guide portion may be arranged, that is extend, in parallel planes, or in the same plane. With the guide portions arranged in parallel planes the camera support may be moved in the camera assembly in a predictable fashion, without any change in tilt angle. In the embodiments where the guide portions are arranged in the same plane, the camera support may be pushed along with a reduced risk of seizing in the guides, which enables the arrangement of a camera head in a particular position with greater ease. This is an important feature as the camera assembly often may be arranged in a location which is difficult to access (providing a good overview of an area to be monitored).

It is in most embodiments desired to have the first and second guide portions extend in parallel at an essentially constant mutual distance, so that the behavior of the camera support is similar at every position along the guide portions.

To further improve the stability of the camera support, and to reduce the risk of the camera support seizing in the guide portions, the first follower portion has an extension in a direction along the first guide portion, preferably on either side of a camera support centerline. The term "seize" refers to that if the camera support would tilt in any direction, the change in effective length could result in that the position of the camera support locks up. This is sometimes referred to as "sticky drawer effect". The extensions, or arms, of the first guide portion will assist in preventing the camera support from tilting.

Furthermore, a free end of the first follower portion may have a longitudinal, along the direction of the guide portion, cutout in an overlapping segment, so as to fit overlappingly with a follower portion of an adjacent camera support arranged in the same camera assembly. The use of an overlapping segment will enable for the extensions or arms to be even longer while still enabling neighboring camera supports to be arranged in close proximity to each other. The way in which the overlap is accomplished may vary between different embodiments, and in the detailed description some different examples are given.

In an effort to quantify preferred features of the overlapping segments, any overlapping segment extending beyond a delimiter, the delimiter being defined by an imaginary line extending normal to the first guide portion, and touching on an outer perimeter of the camera head fixture, also extends at least an equal amount within the same delimiter. With this arrangement the camera head fixture (that is the part of the camera support likely to be the limiting factor in terms of size) of a first camera support may be arranged so as to touch the camera head fixture of a neighboring camera support.

In any embodiment the second follower portion may comprise two follower arms extending on either side of the camera support and configured to engage with the second guide portion or an area adjacent to the second guide portion. The two follower arms will in a way similar to the arms of the first follower portion assist in stabilizing the camera support. To further improve the effect of the two follower arms they may be spring biased so as to push into the second guide portion. In effect, this will push the first follower portion into the first guide portion, which will have several beneficial effects. One effect is that the camera support will be localized in a very precise manner. Another effect is that the tolerances during manufacture of the camera support may be reduced, since the resilience of the follower arms will absorb any smaller variation in effective length. A third result is that the risk of a "sticky drawer effect" is reduced.

The biasing mentioned in the previous paragraph may be accomplished by the internal resilience of a material of the arms, or by an added spring means, such as coil springs, or one or more leaf springs. Other options, which may be used in one or any embodiment, are discussed in the detailed description.

According to one or more embodiments the first and the second guide portion each may form an indented guide track, and a relaxed length of the camera support may exceed a distance between the first and the second guide track. Having an indented track efficiently locks the camera support in a direction orthogonal to the plane of extension of the guide portions. Furthermore, since the camera support will strive to occupy a space (or length basically) exceeding the distance between the first and second track it will be held securely in place. Also, the resilient properties of the camera support enable for the camera support to be arranged in the guide tracks without the use of any tools. First, the second follower portion may be arranged in the second guide track. As the second follower portion is pushed into the second guide track the resilient properties enables for it to be pushed in to the extent that the first follower portion may be arranged in the first guide track. At this stage the camera support may be released and the biasing will push the first follower portion into the first guide track. For a person effecting the installation this means that the camera support may be arranged in its guide tracks by the use of one hand, which again may be a beneficial feature when the camera assembly is located in a difficult position.

According to another aspect the camera support may comprise a locking portion, configured to lock the camera support to a position in which it has been arranged. Moving the camera support should be easy, yet once a desired position has been reached it should be possible to lock the camera support in place.

The locking portion may preferably be arranged to increase frictional hold between the camera support and the camera housing, for example, through the provision of screw means, clamping means, or magnetic means on the camera support and configured to engage frictionally with the camera housing.

In other embodiments the locking portion may comprise a resilient, and compressible, structure arranged on the second follower means and configured to be clamped between the camera housing and the dome as the dome is attached to the camera housing. The location and features of the locking portion results in that as the dome is attached to the housing, the locking portion will be compressed and the frictional hold will increase dramatically, which will hold the camera support in place in a very efficient way. Notably, the dome will have to be removed and replaced when the camera supports are to be moved, and the present teachings result in that the release and locking of the camera support is effected without any additional action.

In one or more embodiments, the resilient structure may be arranged on a side of the camera support facing the dome, and the resilient structure may be attached to or comoulded with the camera support. Having the resilient structure on the side facing the dome results in that the camera support will have a rigid contact with the housing, and a tilt angle of the camera will thus not change regardless of the force used when the dome is attached to the housing. For the effects mentioned the resilient structure would not have to be comoulded with the camera support, it could equally well be attached using an adhesive or in theory be arranged without any adhesive. However, the use of comoulding is an efficient way of accomplishing the resilient structure and ensuring that it is securely attached to the camera support.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 6 is a cross sectional view of a tilt joint of the camera support of FIG. 2;

FIG. 7 is a side view of the tilt joint of FIG. 6; and

FIG. 8 is a cross sectional view of a screw in the tilt joint of FIGS. 6 and 7.

DETAILED DESCRIPTION

Figure 1:
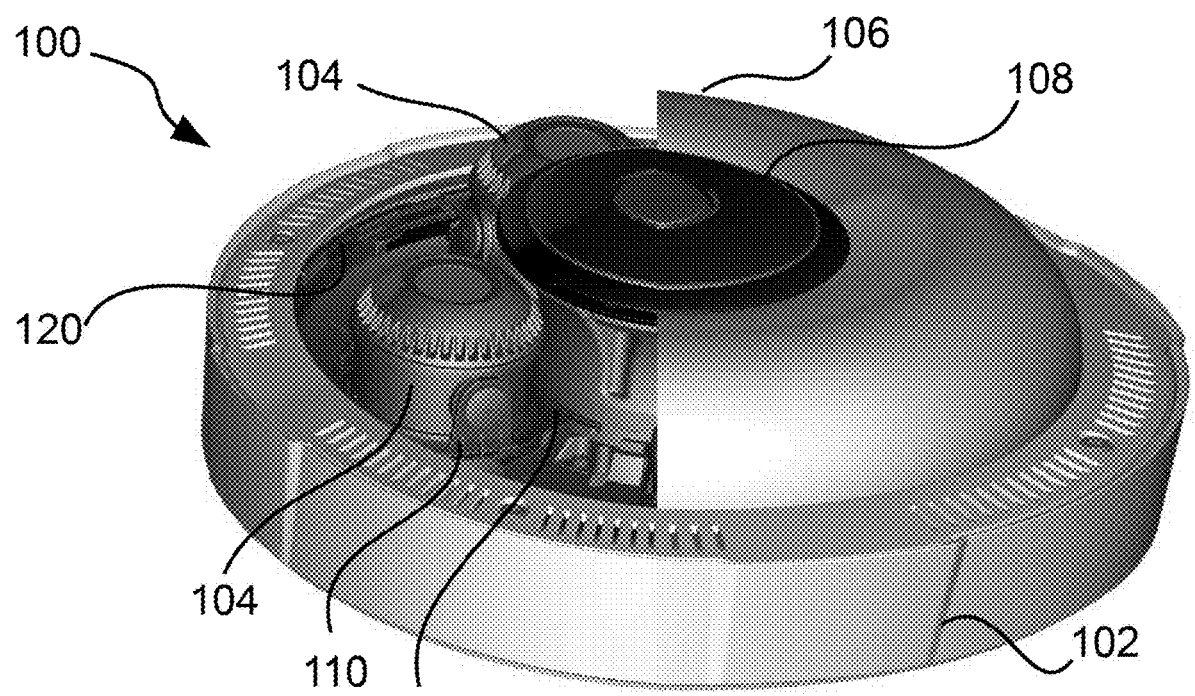
FIG. 1 is a perspective, partially cutaway, view of a camera assembly.

A camera assembly 100, in which the present teachings may be embodied, is illustrated in the perspective view of FIG. 1. The camera assembly 100 comprises a housing 102, one or more camera heads 104, and a transparent dome 106. Part of the transparent dome 106 has been cutaway so some camera heads 104 are clearly visible. A central part 108 of the assembly may comprise connectors, control units etc. (not shown), for receiving, processing and forwarding the result of the imaging effected by the camera heads 104. Two things may be noted to increase the understanding of the present illustrated camera assembly 100; each of the individually mentioned portions may in fact comprise several parts, for example, the "housing 102" may comprise a base, a chassis, several covers etc. Furthermore, these parts may be manufactured from different materials (or the same material). Parts that should have increased rigidity or heat conducting properties (such as may be the case for portions of the housing, in particular the chassis thereof, as well as the bracket) could be made of, for example, aluminum. Suitable processes for applying a color to such parts may be powder coating or electro deposition. Other parts may be made from colored plastics, and the transparent dome may be made from, for example, acrylic or polycarbonate. However, since these individual parts are not considered essential for understanding or enabling the present teachings, detailed description of them will not be provided, yet further information is readily found by observing commercially available products from the present applicant. The other thing to note is that in the illustrated view the camera assembly 100 is basically upside-down as compared to a normal installation, where the camera assembly is attached to a ceiling or mounting base with the camera heads 104 facing down and to the sides to surveil a designated area.

Approaching features that relate to the present teachings, there is a camera support 110 connecting each camera head 104 to the housing 102. Again, as for the housing, each camera support will comprise different portions, and also different parts, which will be further detailed below.

Figure 2:
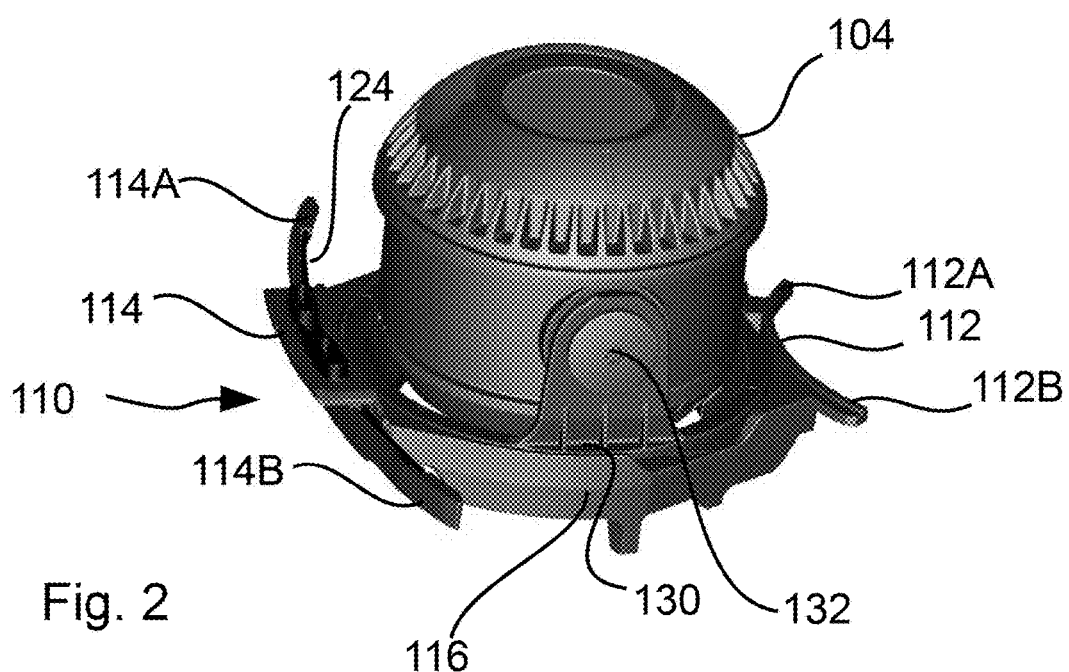
FIG. 2 is a perspective view of a camera support, with a camera head arranged therein.

Referring to FIG. 2 a camera support, according to a first embodiment thereof, is illustrated. The camera support includes first and second follower portions 112 and 114, respectively, arranged opposite to each other on either side of a camera head fixture 116. As touched upon earlier, the camera support 110 is described in isolation, and while it may be provided as an individual constructional element to which a camera head 104 may be attached, it may in fact also form part of the camera head 104 in which case the camera head fixture 116 forms part of, or is rigidly attached to, the camera head 104.

The first follower portion 112 comprises two follower arms 112A and 112B extending in either direction at the end of the camera head fixture 116. The first follower portion 112 is configured to be guided by a first guide portion 118 (FIG. 1) provided in the camera housing 102, and the second follower portion 114 is configured to be guided by a second guide portion 120 (FIG. 1, FIG. 3) provided in the camera housing. The first and second guide portion are preferably arranged in parallel planes, or more preferably in the same plane, to ensure a nimble motion as the camera support 110 is slid along them.

In the imaged embodiment the guide portions 118 and 120 extend in parallel (that is equidistantly) along circumferential paths, in which the first guide portion 118 follows a shorter radius than the second guide portion 120. It is preferred that the follower portions fit into the respective guide portions so as to ensure a secure fit in a direction orthogonal to a plane of movement (the plane or planes in which the guide portions extend). In the illustrated embodiment this is accomplished by the first guide portion 118 being formed from a cutout (or being provided by a groove or indentation in a surface of the housing 102). The second guide portion 120 is formed in a slightly different way, essentially having tabs 120A intermittently formed around the circumference of the guide portion, so as to ensure that the second follower portion 114 is held in place. The particular construction is selected since it enables the material forming the underlying structure to be formed (moulded) in one piece. In other embodiments the secure fit may be accomplished in one of many ways, for example, by a continuous groove or indentation.

Furthermore, the first follower portion 112 extends a length along the direction of the first guide portion by means of the arms 112A and 112B. The extension has a dual purpose, the first being that it offers stability for the camera support 110, such that twisting along an axis extending from the first to the second guide portion is avoided. The second purpose is to prevent the camera support 110 from seizing up as it is pushed along the guide portions, that is that the friction increases dramatically due to the camera support tilting in another direction. For functional reasons the first follower portion 112 extends on both sides of a camera support centerline, preferably in a symmetrical manner (equal lengths on both sides thereof). Essentially, the beneficial effects of the extension increase with the length thereof.

However, a purpose of the camera support 110 is to offer flexibility to a camera arrangement, and in that sense a long extension of the first follower portion 112 will hamper the possibility to arrange two camera supports in close proximity of each other. Essentially, if the first follower portion extends beyond an imaginary line 122 extending normal to the first guide portion 118 and touching an outer perimeter of the camera head fixture 116, it may prevent two adjacent camera supports from being arranged in close proximity where the dimensions of the camera fixture should be the limiting factor. This should be readily understood when read in conjunction with FIG. 3.

In an embodiment where a longer extension of the first follower portion 112 is desired (that is an embodiment where the arms of the first follower portion 112 extend beyond the above defined imaginary line 122, on one or both sides of the camera support 110), the present disclosure may offer a solution. The suggested solution is to design an end of a follower portion 112A such that it fits in an overlapping manner with the end of a follower portion 112B of a neighboring camera support 110, at least along an overlapping segment 124 thereof. There are numerous examples of how this could be done, but in essence the cross section of the follower portion 112A on one side of the camera support 110 fits matingly (or at least overlappingly) with the cross section of the follower portion 112B on the other side of the camera support 110, such that they may slide into an overlapping relationship. As for the length of the overlapping segment 124; if the overlapping segment 124 extends a specific length from the free end of the first follower portion 112A/112B into said imaginary line 122, it should extend at least an equal distance beyond the imaginary line 122, to ensure that the camera head fixtures of two neighboring camera supports 110 may be arranged in immediate proximity to each other. From the embodiment of FIG. 3 it is evident that the shape of the portion of the camera support that connects the camera head fixture 116 to the first follower portion has been maximized in the sense that its lateral perimeters essentially follow the previously mentioned imaginary line 122.

Figure 3:
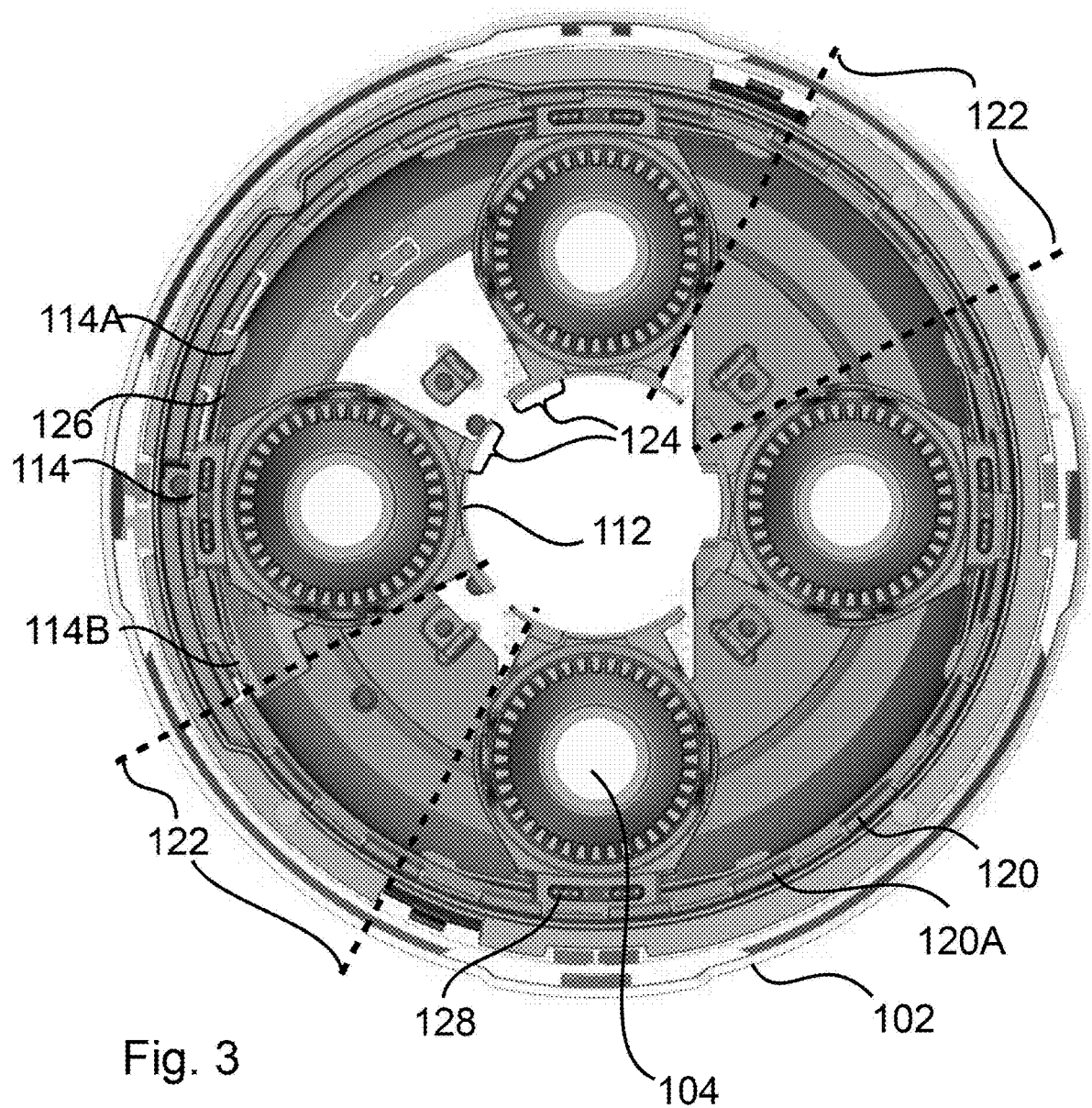
FIG. 3 is a plan view of a camera assembly, with some components removed.

A conclusion may be that the optimal length of the overlapping segment 124 will be affected by the curvature of the first guide portion 118, which will be well defined for each installation. If the curvature varies over the length of the guide portion 118, for example, if the guide portion 118 has an oval shape, or racetrack shape, the highest curvature (lowest radius) will be the limiting factor. Notably, FIG. 3 is a stripped-down plan view of the camera assembly, in which both the dome and the central portion have been removed to the benefit of an improved view of the camera supports 110. The first guide portion has been removed from the illustration, so that some more features of the first follower portion 112 may be visualized.

Figure 5:
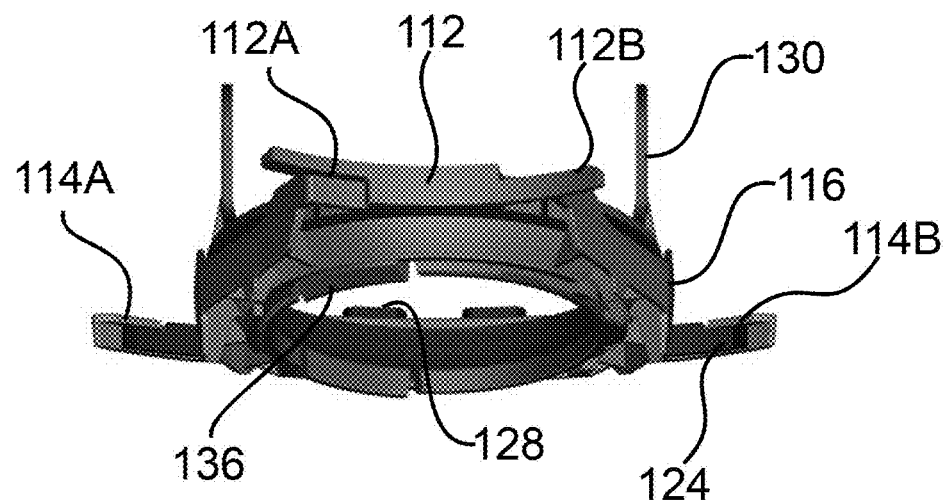

FIG. 5 illustrates one, very specific, arrangement for the first follower portion 112, and it is readily understood how the shape of the two arms 112A and 112B would allow for the overlapping arrangement discussed.

Turning now to the second, or outer, follower portion 114 arranged on the opposite side of the camera head fixture 116 in relation to the first follower portion 112 (see, for example, FIG. 2). The second follower portion 114 should essentially meet the same criteria as the first follower portion. In the illustrated embodiment, as visualized in FIGS. 2 and 3, where the second guide means 120 is arranged at a larger radius, there is rarely needed an overlap of neighboring follower portions to ensure stability. Again, the second follower portion comprises two follower arms 114A and 114B, respectively, extending in either direction of the camera head fixture. Should the arms of the second follower portion extend beyond the previously discussed imaginary line, similar overlapping segments would offer the same effects as previously discussed in the context of the first follower portion. Notably, the follower arms 114A and 114B do not necessarily have to be arranged in the second guide portion 120 provided that a central portion of the second follower portion 114 offers sufficient support when guided by the second guide portion 120.

Furthermore, the second follower portion 114, or at least the arms thereof, may be spring biased in a direction essentially perpendicular to the second guide portion 120, so as to bias the camera support towards the first guide portion. The biasing may be accomplished by structural resilience of the second follower portion in itself 114, yet in the present embodiment at least the arms 114A and 114B of the second follower portion are spring biased by means of a leaf spring 126, offering a simple and functional biasing effect. The sought-for effect could also be achieved by incorporating a resilient material onto an otherwise rigid construction. As an example, a material such as silicone, an open cell foam (for example, Poron®), or a closed cell foam could be arranged on the side of the second follower means facing the second guide portion. This layer of resilient material could optionally be covered by a further material to decrease wear and tear. Neither of these latter embodiments are shown in the illustrations.

There are multiple beneficial effects resulting from biasing the camera support 110. One effect is that the camera support will be securely localized in that it will be rigidly supported by the first guide portion 118, thus cancelling out any other manufacturing tolerances. Another effect is that it will be readily possible to slot the camera support into the first and second guide portion by compressing the spring biased follower portion during an assembly phase.

The spring biasing may also enable a toothed engagement between the second follower portion and the second guide portion, where the friction between the two is increased mechanically. This is, however, not the case for the illustrated embodiment, but could be for others.

In other embodiments the spring biasing may be accomplished by a similar arrangement for the first follower portion instead, in which case the camera support will be biased towards the second guide portion.

In the present embodiment, see, for example, FIG. 3, the arms of the second follower portion are not arranged in the second guide portion, whereas a central segment of the second follower portion is. The central portion will be the main contributor when it comes to keeping the camera support in place, while the arms will be the main contributor regarding ensuring that the camera support may be moved smoothly along the guides.

Thus far the focus for the embodiment disclosed is how to accomplish a smooth and precise motion into a particular position amongst a plurality of continuously distributed possible positions. A further issue may be how to ensure that the camera support maintains the position in which it is located. For some installations this may not be an issue, while for others, for example, where vibrations and gravity in combination may force the camera support out of position, this may be a problem that must be addressed. There are obviously a multitude of prior art solutions available, for example, using clamping means, fixating screws, fixating magnets, etc.

Figure 4:
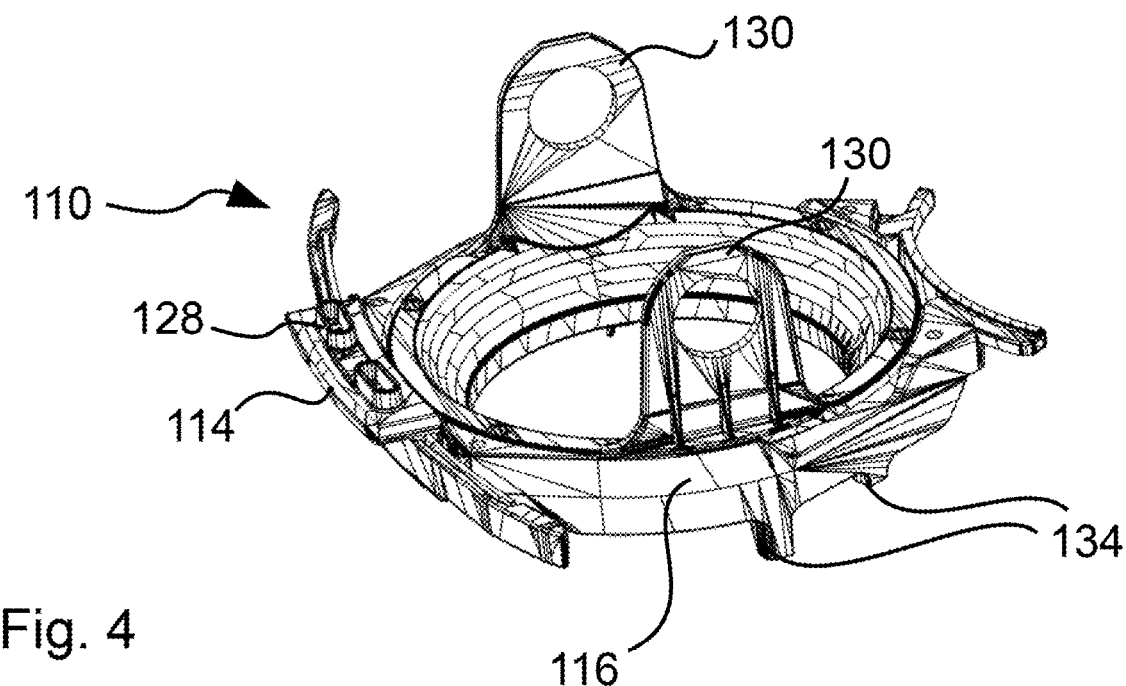
FIGS. 4 and 5 are perspective views of a camera support according to an embodiment of the present teachings.

Many prior art solutions would, however, give rise to an extra effort from an fitter assembling the camera system, which is in contradiction to the present teachings (which should not be construed as if the use of such prior art solutions is ruled out). For that reason, the present teachings, according to the illustrated embodiment, comprise a resilient locking portion 128, as is shown in FIG. 4. FIG. 4 corresponds to the view of FIG. 2, yet with the camera head 104 removed. Any previous explanation referring to FIG. 2 may therefore gain from observing FIG. 4, although the numbering is not repeated. The locking portion 128 basically consists of a compressible structure, being compressible in at least a direction orthogonal to the plane (or planes) of the guide portions. As the dome is arranged over the housing including the camera support, the resilient locking portion may be clamped between the dome and the housing of the assembly, and thus the camera support will be held securely in place due to the increased frictional force preventing it from moving along the guide portions. In the illustrated embodiment the resilient locking portion is arranged at the end of the second follower means 114, resulting in that there will be ample support from a base of the housing, and that the locking forces are applied close to where the cover will be attached to the housing. Furthermore, the locking portion 128 is arranged on the side of the camera support 110 facing the dome 104, ensuring that the camera support 110 will be statically arranged against a rigid support during the entire procedure, and consequently no flex or other force is introduced in the camera support.

Referring to FIGS. 2, 4, and 5 the camera head fixture may furthermore be arranged to comprise a rotational joint, so that a camera head 104 arranged in the camera head fixture 116 may be rotated in a panning direction, that is around an axis normal or essentially normal to the plane in which the first and/or second guide means is arranged. The pan joint is preferably effected by two parts rotationally attached to each other. One part is the part of the camera head fixture 116 interconnecting the first and the second follower portion, and the other part 130 is the part to which the camera head 104 is tiltably arranged via tilt joint 132. In several embodiments it is preferred that the pan joint is balanced such that the force that has to be applied to overcome the frictional force in order to rotate the joint is considerably greater than a force required to push the camera support along the guide portions. The reason is that the pan joint should not be affected as the camera support is moved along its guides.

A convenient way to realize the pan joint is to snap the part 130 into a circular opening of the camera head fixture, 116. In FIG. 5 one may see locking tabs 136 of the part 130 extending beyond and partly around an edge of the circular opening of the camera head fixture 116. This is one way to ensure a reliable and releasable connection, yet there are obviously many more ways to accomplish a pan joint.

For most use cases, a camera head would be directed radially and symmetrically outwards, in which case a pan joint of the type described would not be required (or any other pan joint for that matter). There are, however, use cases for which it could be preferred to have two camera heads directed in approximately the same direction. The presence of the pan joint would then enable for a user to first arrange the two camera heads as close as possible, and then to twist one or both of the camera heads by use of the rotational joint so that they essentially could have the same field of view (or image overlapping areas with the same or different magnifications).

As mentioned, the first portion of the pan joint may be a constructional portion of the camera head fixture 116, and the second portion of the rotational joint may be the part that subsequently attaches to the camera head by means of a pivot joint or tilt joint 132. The tilt joint may be present in embodiments not having the pan joint, since the possibility to tilt the camera head is a useful feature in itself.

Returning to the frictional force in the pan joint this may be accomplished in one of several ways, including a toothed engagement, a tightening screw, a clamping means etc. Rotation of the camera head about the pan joint may introduce image distortion, as such rotation generally changes an angle between the optical axis of the camera head and the inside of the camera dome (away from an axis of symmetry). Therefore, such rotation may need to be avoided depending on the use case for the camera.

The tilt joint 132 may be of a known type, as readily understood from the drawings. By varying the tension in this joint, the frictional force of the tilt joint may be adjusted to a suitable level. A suitable level is a level that is low enough to allow for a user to tilt the camera head without affecting the rest of the construction, yet high enough not to allow for the camera head to tilt inadvertently during use (for example, due to vibration). If such suitable level is not possible to achieve the pivot joint should allow for release—with or without tools—as the camera head is to be tilted, and to be locked as a suitably tilt angle has been reached.

In embodiments where the camera head requires a wired connection, for example, for transmission of power or information (or both) there are additional challenges posed on the assembly. Such wire or cable will have to be long enough to allow for the camera support to move along the tracks, yet the longer the cable the higher the risk of the cable getting in the way or getting clamped between moving parts. In an effort to reduce the possible adverse effect, the camera support may, in some embodiments, comprise one (or more) guide tabs 134. The guide tab or tabs 134 extend from the camera support 110 in the direction of the camera housing, as illustrated in FIGS. 2 and 4 (with reference numerals indicated in FIG. 4 only). The guide tab 134 should be designed such that it occupies the clearance between the camera support 110 and the camera housing to the extent that the cable cannot pass between a free end of the tab 134 and the housing 102. This will keep the cable in the clearance and on a designated side of the tab. The clearance as such is obviously dimensioned so that the cable (or cables/wires) may pass freely, and consequently the tab will guide the cable(s) in the clearance, so that it follows the desired path. Preferably, there is a tab on either side of the camera support (that is additional tab or tabs on the remote side not seen in FIGS. 2 and 4), essentially on either side of the camera head fixture 116. Also, further tabs may be arranged so as to localize a cable in an even more restricted area.

The embodiments described above make it possible to achieve great flexibility in the placement of the camera heads. Further features may be added in order to ensure or increase such flexibility. One further factor that may limit how close to each other the camera heads, or rather the optical axes of the camera heads, may be placed is a width of each camera head. If the camera head is relatively wide, the optical axes of two camera heads cannot be placed close to each other even if the camera heads are moved so close as to abut each other. It may therefore be beneficial to reduce the width of each camera head. One feature of the camera head that may add to the width is the tilt joint 132. In many prior art cameras, tilt joints are formed in which a hand-operated screw is placed on either side of the camera head for releasing and locking the tilt joint at a desired angle. By tightening the screws, friction in an axial direction along the screws is achieved, thereby locking the camera head at its current tilt angle. However, in order to ensure sufficient frictional force, and in order to provide a hand-operable screw head, the screws need to be reasonably long, thereby adding to the width of the camera head.

The tilt joint 132 shown in FIG. 2 may be formed in a way that adds less to the width of the camera head 104. Instead of relying on an axial friction force, a radial friction force may be achieved. This will now be discussed further with reference to FIGS. 6-8.

In FIG. 6, a cross section of the tilt joint 132 on one side of a camera head 104 is shown. Parts of a housing 601 of the camera head are shown, as well as part of a holder 602 holding the camera head. A friction ring 603 is arranged between the housing 601 and the holder 602. A tightening screw 604 is arranged in the holder, concentric with the friction ring 603. The housing 601 and holder 602 may, for instance, be made of plastic material. The friction ring 603 may be made of rubber or an elastomeric material. As indicated in FIG. 7, two slots 605 are formed in the holder 602 where the holder 602 contacts the friction ring 603. The slots allow the holder 602 to deform. FIG. 8 shows a cross section of the tightening screw 604. As may be seen here, the cross section is not circular, but rather rhombus shaped, with a first width $W_1$, and a second width $W_2$, wherein the second width $W_2$ is larger than the first width $W_1$. By turning the tightening screw 604 a quarter turn, it may exert pressure on the surrounding holder, and the slots 605 allow the holder 602 to deform, such that pressure is exerted on the friction ring. Thereby, an increased radial frictional force is achieved between the camera head housing 601 and the holder 602, such that the camera head may be prevented from rotating in a tilting motion around the tilt joint 132. When the tightening screw 604 is not tightened, the camera head may be tilted to a desired tilt angle. The tilt joint may then be locked by turning the tightening screw 604 a quarter turn. As the locking is achieved by a radial friction force rather than the conventional axial friction force, the length of the tightening screw 604 may be kept short, such that the tilt joint adds only a little to the overall width of the camera head.

What is claimed is:

1. A camera assembly comprising:
    a camera dome, a camera housing, and a plurality of camera heads arranged inside the housing and the camera dome, each camera head being arranged in a camera support which is movable around a center of the camera assembly, wherein:
    each camera support has a first inner follower portion configured to engage a first inner guide portion of the camera housing, and a second outer follower portion configured to engage a second outer guide portion of the camera housing, and a camera head fixture connecting the first inner follower portion with the second outer follower portion;
    each follower portion is arranged to slide in the corresponding guide portion; and
    the first inner follower portion comprises a first arm and a second arm, the first arm and the second arm each having an extension in a direction along the first inner guide portion on both sides of a camera support centerline.

2. The camera assembly of claim 1, wherein the first and second guide portion are arranged in parallel planes, or in the same plane.

3. The camera assembly of claim 1, wherein the first and second guide portion extend in parallel.

4. The camera assembly of claim 3, wherein the first and second guide portion extend in parallel at a constant mutual distance.

5. The camera assembly of claim 1, wherein a free end of the first follower portion has a longitudinal, along the direction of the guide portion, cutout in an overlapping segment, so as to fit overlappingly with a follower portion of an adjacent camera support arranged in the same camera assembly.

6. The camera assembly of claim 5, wherein any overlapping segment extending beyond a delimiter, the delimiter being defined by an imaginary line extending normal to the first guide portion, and touching on an outer perimeter of the camera head fixture, also extends at least an equal amount within the same delimiter.

7. The camera assembly of claim 1, wherein the second follower portion comprises two follower arms configured to engage with the second guide portion.

8. The camera assembly of claim 7, wherein the two follower arms are spring biased so as to push into the second guide portion.

9. The camera assembly of claim 8, wherein the spring biasing is accomplished by the internal resilience of a material of the follower arms, or by an additional biasing element.

10. The camera assembly of claim 9, wherein the additional biasing element includes coil springs, or one or more leaf springs.

11. The camera assembly of claim 1, wherein the first and the second guide portion each form an indented guide track, and wherein an untensioned length of the camera support exceeds a distance between the first and the second guide track.

12. The camera assembly of claim 1, wherein the camera support comprises a locking portion, configured to lock the camera support to a position in which the camera support has been arranged.

13. The camera assembly of claim 12, wherein the locking portion is arranged to increase frictional hold between the camera support and the camera housing through at least one of screw means, clamping means, or magnetic means on the camera support and configured to engage frictionally with the camera housing.

14. The camera assembly of claim 12, wherein the locking portion comprises a resilient structure arranged on the second follower portion and configured to be clamped between the camera housing and the dome as the dome is attached to the camera housing.

15. The camera assembly of claim 13, wherein the locking portion comprises a resilient structure arranged on the second follower portion and configured to be clamped between the camera housing and the dome as the dome is attached to the camera housing.

16. The camera assembly of claim 14, wherein the resilient structure is arranged on a side of the camera support facing the dome, and wherein the resilient structure is attached to or comoulded with the camera support.

17. The camera assembly of claim 15, wherein the resilient structure is arranged on a side of the camera support facing the dome, and wherein the resilient structure is attached to or comoulded with the camera support.

* * * * *